Dec. 16, 1969    A. WINSEL    3,484,617
ELECTRICAL POWER SYSTEM FOR A LOAD IN A REMOTE AREA
Filed Nov. 8, 1967    2 Sheets-Sheet 1

United States Patent Office 3,484,617
Patented Dec. 16, 1969

3,484,617
ELECTRICAL POWER SYSTEM FOR A LOAD IN A REMOTE AREA
August Winsel, Braunschweig, Germany, assignor of one-half to Varta Aktiengesellschaft, Frankfurt am Main, Germany, and Siemens Aktiengesellschaft, Munich, Germany, both corporations of Germany
Filed Nov. 8, 1967, Ser. No. 681,418
Claims priority, application Germany, Nov. 25, 1966, V 32,419
Int. Cl. H02p 9/04
U.S. Cl. 290—44          10 Claims

ABSTRACT OF THE DISCLOSURE

A conduit interconnects a DC generator, a pressure electrolysis battery electrically connected to and energized by the generator, electrolyte storage tanks storing gas electrolyte, and a hydrogen-oxygen fuel cell battery in a closed system. A pump is interposed in the conduit for circulating the gas electrolyte through the closed system and between the pressure electrolysis battery and the fuel cell battery. A load which consumes electricity is connected to and energized by the fuel cell battery. The DC generator is preferably driven by a natural force, such as wind, via wind sails affixed to the shaft of the generator.

DESCRIPTION OF THE INVENTION

The present invention relates to an electrical power system for a load in a remote area. More particularly, the invention relates to an electrical power system which derives its basic power from a wind-driven DC generator, and which is therefore especially adapted for powering a load in a remote area.

Fuel cells have been utilized for energizing electrical systems in remote areas, such as, for example, mountain tops or other out-of-the-way places where radio relay or video relay or converter stations are located. Methanol fuel cells are especially suited for this purpose and have thus been frequently utilized in such systems (see "Brennstoff Elemente," Fuel Elements, W. Vielstich, published by Chemie, G.m.b.H., Weinheim, Germany, 1965, pages 237, etc.)

Fuel cells in general are described in "Chemical Generation and Storage of Electricity" by A. M. Adams, Proc. Inst. Elec. Engrs., London, 1956, vol. 2(13). Methanol fuel cells have the disadvantage that they are operated with an alkaline electrolyte in order to provide better capacity, so that they consume lye with the methanol fuel. Lye is expensive. It is impossible to provide maintenance-free operation of the methanol fuel cells, because water and carbon dioxide form during the electrochemical reaction. In order to avoid consumption of the electrolyte in very short periods of usage, it is necessary to utilize additional and expensive equipment.

The various disadvantages of methanol fuel cells may be avoided by utilizing hydrogen-oxygen fuel cells rather than said methanol fuel cells. Hydrogen-oxygen gas cells do not produce carbon dioxide and do not consume the electrolyte. Hydrogen oxygen fuel cells are described in "High-Pressure Hydrogen-Oxygen Fuel Cell" by J. D. S. Forrest, "Engineer," 1956, vol. 202 (5243). When hydrogen-oxygen fuel cells are utilized, the fuel must be conveyed to the location of the consuming cells. This is rather difficult and complicated to achieve due to the pressure vessels or tanks required, and has therefore discouraged practical use of hydrogen-oxygen fuel cells. Furthermore, in hydrogen-oxygen fuel cells, the electrolyte is constantly diluted by the reaction water so that additional equipment must be utilized for the removal of such reaction water and for concentration control.

The principal object of the present invention is to provide a new and improved electrical power system for a load in a remote area. The power system of the present invention utilizes fuel cells and overcomes the disadvantages of the prior art systems which utilize fuel cells. The power system of the present invention functions with efficiency, effectiveness, relative simplicity and reliability. The power system of the present invention is relatively maintenance-free and is especially suitable for operation in inaccessible and remote areas.

In accordance with the present invention, an electrical power system for a load in a remote area comprises a DC generator. A pressure electrolysis battery is electrically connected to and energized by the generator. Electrolyte storage means stores gas electrolyte. A hydrogen-oxygen fuel cell battery, the pressure electrolysis battery and the electrolyte storage means are interconnected by conduit in a closed system. A pump is interposed in the conduit for circulating the gas electrolyte through the closed system and between the pressure electrolysis battery and the fuel cell battery. A load is electrically connected to and energized by the fuel cell battery.

A pressure equalizer is interposed in the conduit for maintaining the same pressure in the closed system. An electrolyte storage means comprises a plurality of electrolyte storage tanks. Each of the pressure electrolysis battery and the fuel cell battery has an input coupled via the conduit to a corresponding one of the electrolyte storage tanks and an output coupled via the conduit to a corresponding one of the electrolyte storage tanks. Oxygen storage means stores oxygen and is connected into the closed system by the conduit and hydrogen storage means stores hydrogen and is connected into the closed system by the conduit. A piston arrangement is mechanically coupled to the pump and a cylinder houses the piston arrangement and is connected by the conduit into the closed system to recover the compression energy in the system.

A natural force is adapted by means mechanically coupled to the DC generator to drive such generator. Wind sails are mechanically coupled to the shaft of the DC generator for driving the DC generator by wind. The pressure electrolysis battery includes a plurality of electrolysis cells which determine the capacity of the pressure electrolysis battery in accordance with the number of the electrolysis cells energized. An electrical switch is interconnected between the DC generator and each of the electrolysis cells for selectively energizing a desired number of the electrolysis cells, thereby adjusting the capacity of the pressure electrolysis battery in accordance with the wind velocity. In a modification of the present invention, the DC generator comprises a plurality of DC generators mounted on a common shaft on which the wind sails are mounted. The electrical switch is interconnected between each of the DC generators and a corresponding one of the electrolysis cells. The number of the DC generators connected in circuit is determined in a manner whereby the angular velocity of the wind sails corresponds to the velocity of the wind.

In order that the present invention may be readily carried into effect, it will now be described with reference to the accompanying drawings, wherein.

Figure 1:
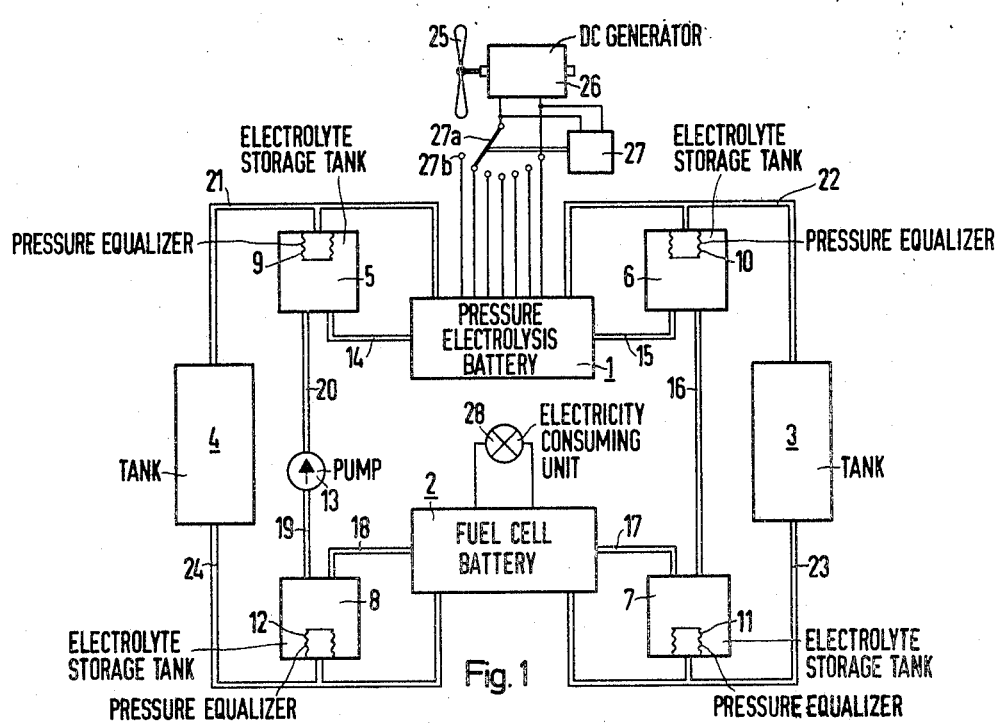
FIG. 1 is a schematic system diagram of an embodiment of the electrical power system of the present invention.

In the figures, the same components are identified by different reference numerals, since they appear in different modifications of the present invention.

In view of the fact that the electrical power system of the present invention is especially suited for use in remote and inaccessible areas where there is usually sufficient natural wind energy available, the wind may be utilized as the basic power source for said power system. The power system of the present invention operates continuously, despite the fluctuations of the wind which, of course, is dependent upon weather conditions. In the power system of the present invention, the wind energy is converted to electrical energy and is stored in the pressure electrolysis battery as chemical energy. The stored chemical energy is then reconverted to electrical energy in a hydrogen-oxygen cell battery. The electricity-consuming unit or load is supplied with the electrical energy from the fuel cell battery.

The DC generator utilized in the power system of the present invention to convert wind energy to electrical energy produces a voltage which varies in accordance with the wind velocity. The voltage produced by the DC generator energizes a plurality of electrolysis cells of a pressure electrolysis battery in a manner whereby an additional electrolysis cell is connected in series by a selective electrical switch, upon an increase in the angular velocity of the generator shaft and a corresponding increase in voltage by approximately 1.5-2.0 volts. This adjusts the capacity of the pressure electrolysis battery to the wind velocity and permits twice the volume of electrolysis gases to be produced by the same electric current, for example, and thereby produces twice the quantity of stored chemical energy. The electrical switch may be operated by a relay.

Figure 2:
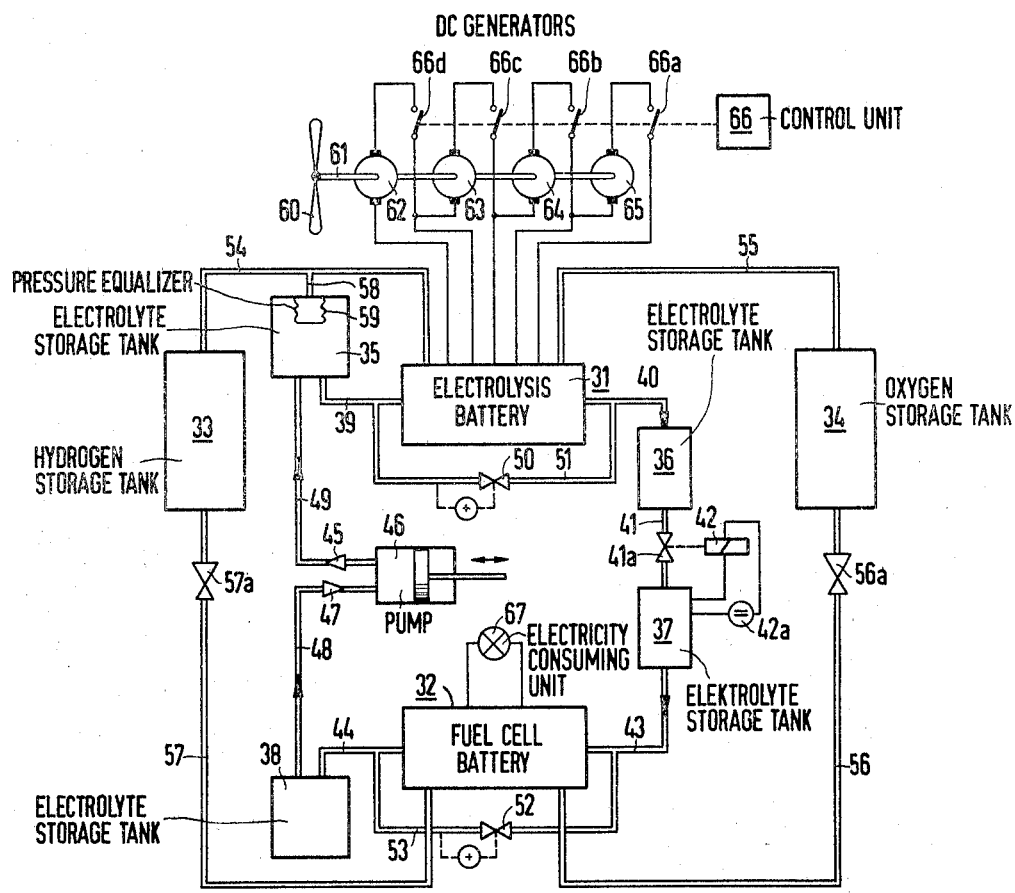
FIG. 2 is a schematic system diagram of a modification of the embodiment of FIG. 1.

In a modification of FIG. 2 of the present invention, a plurality of DC generators is utilized on a common generator axis on which the wind sails are also mounted. The generators are utilized to adjust the capacity of the pressure electrolysis battery to the wind velocity by being switched, under the control of an electric switch, to corresponding ones of the electrolysis cells of said pressure electrolysis battery. Thus, a number of the DC generators are disconnected from their corresponding electrolysis cells and provide a restraining force on the common shaft thereby adjusting the angular velocity of the wind sails to the wind velocity. This provides maximum utilization of the wind energy. In the modification of FIG. 2, the velocity of the wind sails, and therefore the common generator shaft, may be maintained at an average value by intermittent derivation of electrolysis current.

If the wind effectiveness is WE and the efficiency of the wind energy converting unit including the pressure electrolysis battery is E, the resultant efficiency or capacity RE at which the chemical energy is provided, is a function of the wind velocity V. Thus $$RE(V) = [WE(V)][E(V)] \qquad (1)$$

The efficiency or capacity EF of the hydrogen-oxygen gas fuel cell battery utilized in the power system of the present invention is constant at a constant efficiency EL of the load or electricity consuming unit. Thus, the required efficiency or capacity of the power system of the present invention is $$EL/EF \qquad (2)$$

Commencing at a time TO, the chemical energy balance for a time period $\Delta T$ is equal to the time integral of the available energy or capacity of the power system including the pressure electrolysis battery, minus the efficiency of capacity of the fuel cell battery and the load. The chemical energy EC is thus $$EC(TO, \Delta T) = \int_{TO}^{TO + \Delta T} [WE(V)E(V) - EL/EF]dt \qquad (3)$$

The power system of the present invention is designed so that the effective or available wind energy during an average period of time is sufficient to provide all the electrical energy required by the load, including all the losses in the system. Thus $$\lim_{\Delta T \to \alpha} EC(TO, \Delta T) = \lim_{\Delta T \to \alpha} \int_{TO}^{TO + \Delta T} [WE(V)E(V) - EL/EF]dt > 0 \qquad (4)$$

If the wind velocity VO is that velocity which is adequate for continuous operation of the power system of the present invention, such wind velocity VO may be derived from $$[WE(VO)][E(VO)] = EL/EF \qquad (5)$$

The wind velocity VO corresponds to the most frequently encountered wind velocity at the site of the power system. Since the most frequently encountered wind velocity is always smaller than the average wind velocity, however, Equation 4 is also satisfied.

Since for a short time interval $\Delta T$ a complete lack of wind or zero velocity V is equal to the integral of the chemical energy relative to TO, $\Delta T$, which is less than zero, and in an infinite internal of time $\Delta T$ equals infinity, but the chemical energy relative to TO, $\Delta T$ is greater than zero, the required storage capacity is determined by a minimum energy EM applying to the chemical energy relative to TO, $\Delta T$. The minimum required energy EM thus indicates the energy required to be provided by the gas supply of the power system and therefore indicates the required capacity for tanks which store such gas.

If a voltage of 0.75 volts is provided in the hydrogen-oxygen cell battery of the power system of the present invention, 54 ampere/hours, which is the equivalent of approximately 40 watt/hours, is provided by one mole of hydrogen and one-half mole of oxygen. Thus, in order to maintain continuous operation during a 24-hour period without wind, for example, a 100 watt installation requires a gas reserve of 60 moles of hydrogen and 30 moles of oxygen. Under normal operating conditions, the reserve volume of hydrogen is 1340 liters. Since absolute calm or lack of wind is very rare in high and mountainous regions, over a period of several days, a gas reserve supply of from 1-10 cubic manometers is usually sufficient for a 100 watt power system. In accordance with geographic and local features, of course, it may be desirable to utilize water power as a natural force rather than wind, to drive the DC generator. Thus, for example, in a jungle area of low level having very little wind activity a nearby waterfall may be utilized to considerable advantage as a continuous source of natural driving force.

In the power system of the present invention, the electrolyte gases must be supplied to the gas storage tanks against high gas pressure. This requires that in the pressure electrolysis battery the gas pressure from the storage tanks be fed back to the electrolyte chamber. The gas storage tanks and the pressure electrolysis battery are provided in a system which utilizes a common pressure. If necessary, the hydrogen-oxygen gas fuel cell battery may be included in the common pressure system. In such case, the gas pressure from the storage tanks is also fed back to the electrolyte of the hydrogen-oxygen fuel cell battery, except for a portion thereof which is equal to the difference in working pressure between said storage tanks and said electrolyte chamber. If similar types of electrodes are utilized, the pressure of the electrolyte in the pressure electrolysis battery and in the hydrogen-oxygen fuel cell battery is the same.

During pressure electrolysis, water is consumed and is converted to electrolysis gases which are stored and subsequently reconverted to electrical energy in the hydrogen-oxygen fuel cell battery. The water produced in the hydrogen-oxygen fuel cell battery must be resupplied to the pressure electrolysis battery in order to maintain a continuous operation. This may be achieved in the power system of the present invention by a rotary pump which resupplies the water at a constant hydrostatic pressure. The electrolyte in the power system of the present invention is continuously supplied in a cycle, and the concentration of the electrolyte remains constant throughout the system. In order to reduce polarization, it is of advantage to permit the electrolyte to flow not only to the electrolyte chambers of the pressure electrolysis battery and the fuel cell battery, but to permit it to completely or partially fill a plurality of pores.

In FIG. 1, a pressure electrolysis battery 1 is electrically energized by a DC generator 26. The DC generator 26 is driven by the force of the wind via wind sails 25 mounted on the shaft thereof. An electrical switch which includes a relay 27, a switch arm 27a and a plurality of switch contacts 27b interconnects the voltage provided by the DC generator 26 to selected ones of the electrolysis cells of the pressure electrolysis battery 1. The capacity of the pressure electrolysis battery 1 is adjusted in accordance with the wind velocity by means of the connection of the selected cells thereof via the electrical switch. The pressure electrolysis battery 1 may comprise any suitable known pressure electrolysis battery.

A fuel cell battery 2 preferably comprises a hydrogen-oxygen fuel cell battery of known type. A load or electricity-consuming unit 28 is electrically connected to and energized by the fuel cell battery 2. The pressure electrolysis battery 1 functions, as hereinbefore described, to convert the electrical energy produced by the DC generator from the force of the wind to chemical energy and the fuel cell battery 2 functions to reconvert the chemical energy to electrical energy.

Oxygen is stored in a gas storage tank 3 and hydrogen is stored in a gas storage tank 4. Electrolyte for the pressure electrolysis battery 1 is stored in an electrolyte storage tank 5 connected to the input of said battery and is also stored in an electrolyte storage tank 6 connected to the output of said battery. Electrolyte for the fuel cell battery 2 is stored in an electrolyte storage tank 7 connected to the input of said battery and in an electrolyte storage tank 8 connected to the output of said battery. The electrolyte storage tanks 5, 6, 7 and 8 include pressure equalizing devices 9, 10, 11 and 12, respectively. The pressure equalizing devices 9, 10, 11 and 12 function to equalize the pressure difference produced by pressures on both sides of the gas diffusion electrodes of the batteries 1 and 2.

A conduit comprising a plurality of conduit sections 14, 15, 16, 17, 18, 19 and 20 interconnects the pressure electrolysis battery 1, the electrolyte storage tanks 5, 6, 7 and 8 and the fuel cell battery 2 in a closed system. A suitable pump such as, for example, a rotary pump 13, is interposed between the conduit sections 19 and 20 of the conduit and functions to circulate the gas electrolyte through the closed system and between the pressure electrolysis battery 1 and the fuel cell battery 2.

The pressure electrolysis battery 1 provides hydrogen to the storage tank 4 via a conduit section 21 and said battery provides oxygen to the storage tank 3 via a conduit section 22. Fuel cell battery 2 is provided with oxygen from the oxygen storage tank 3 via a conduit section 23 and said battery is provided with hydrogen from the hydrogen storage tank 4 via a conduit section 24. Each of the storage tanks 3, 4, 5, 6, 7 and 8 is provided with suitable valves, not shown in the figures, which valves include valves for the removal of excess gas and which thereby prevent the pressure difference between the different ones of said storage tanks from exceeding a determined magnitude.

The electricity-consuming unit or load 28 may comprise any suitable load, utilized under the circumstances described, such as, for example, the light of a lighthouse, a radio or television station or the like.

In the modification of FIG. 2, the fuel cells of a hydrogen-oxygen cell battery 32 are operated at a pressure which is lower than the pressure of the electrolysis cells of an electrolysis battery 31. The pressure of operation of the cells of the fuel cell battery 32 may be, for example, atmospheric pressure. In this system, the pressure of the gases stored in the storage tanks need only be reduced to the pressure of operation of the electrodes of the fuel cells. This may be accomplished by pressure relief valves, not shown in the figures. The cycle of operation of electrolysis must, in this case, overcome the difference in hydrostatic pressure between the hydrogen-oxygen gas cells of the fuel cell battery 32 and the electrolysis cells of the electrolysis battery 31. This requires almost no energy however, since the volume of liquid circulated is negligible, so that the output of the pump, which results from the product of the volume and pressure difference, is also negligible.

In FIG. 2, hydrogen is stored in a hydrogen storage tank 22 and oxygen is stored in an oxygen storage tank 34. Electrolyte is stored in an electrolyte storage tank 35 connected to the input of the electrolysis battery 31 and in an electrolyte storage tank 36 connected to the output of the said battery. Electrolyte is stored in an electrolyte storage tank 37 connected to the input of the fuel cell battery 32 and in an electrolyte storage tank 38 connected to the output of said battery. The electrolysis battery 31, the electrolyte storage tanks 35, 36, 37 and 38 and the fuel cell battery 32 are interconnected in a closed system by a conduit which comprises conduit sections 39, 40, 41, 43, 44, 48 and 49. A pressure equalizer 59 is indicated in the electrolyte storage tank 35.

Hydrogen from the electrolysis battery 31 is supplied to the hydrogen storage tank 33 via a conduit section 54 and oxygen from said battery is supplied to the oxygen storage tank 34 via a conduit section 55. Hydrogen is supplied from the hydrogen storage tank 33 to the fuel cell battery 32 via a conduit section 57 and a valve 57a. Oxygen is supplied from the oxygen storage tank 34 to the fuel cell battery 32 via a conduit section 56 and a valve 56a. The valves 56a and 57a function as pressure relief valves.

A load or electricity-consuming unit 67 is electrically connected to and energized by the fuel cell battery 32. A pump of any suitable type such as, for example, a piston type pump 46, is interposed between the conduit sections 48 and 49. A valve 47 is interposed in the conduit section 48 between the electrolyte storage tank 38 and the pump 46 and a valve 45 is interposed in the conduit section 49 between said pump and the electrolyte storage tank 35.

In the modification of FIG. 2, the DC generator comprises a plurality of DC generators 62, 63, 64 and 65 mounted on a common generator shaft 61. Wind sails 60 are also mounted on the common shaft 61. A control unit 66 which may comprise any suitable control arrangement such as, for example, an electrical switch, controls a plurality of switch arms 66a, 66b, 66c and 66d which function to connect the generators 65, 64, 63 and 62, respectively, into the circuit by connecting each of said generators to a corresponding one of the electrolysis cells of the electrolysis battery 31. The number of DC generators 62, 63, 64 and 65 which are connected in circuit is determined so that the rotary velocity of the wind sails 60 corresponds to the wind velocity.

In the modification of FIG. 2, the electrolyte circulates in a manner commencing with the electrolyte storage tank 35. The electrolyte first flows through the conduit section 39 from the electrolyte storage tank 35 to the electrolysis battery 31. The electrolyte then flows via the conduit section 40 from the electrolysis battery 31 to the electrolyte storage tank 36. Due to the excess pressure in the electrolysis battery 31 and in the electrolyte storage tanks 35 and 36, the electrolyte continues to flow to an electrolyte storage tank 37 via a conduit section 41 and a valve 41a. The electrolyte then flows from the electrolyte storage tank 37 to the fuel cell battery 32 via the conduit section 43. The electrolyte flows from the fuel cell battery 32 to the electrolyte storage tank 38 via the conduit section 44. The electrolyte is then pumped by the pump 46 from the electrolyte storage tank 38 to the electrolyte storage tank 35 via the conduit section 48, the valve 47, the valve 45 and the conduit section 49.

A conduit section 51 is provided as a bypass for the electrolysis battery 31 and extends between the input and output thereof. A conduit section 53 is provided as a bypass for the fuel cell battery 32 and is connected between the input and the output thereof. An excess pressure valve 50 is interposed in the conduit 51 and an excess pressure valve 52 is interposed in the conduit 53. The excess pressure valve 50 functions to prevent too great a pressure difference from arising between the electrolyte storage tanks 35 and 36. The excess pressure valve 52 functions to prevent too great a pressure difference from arising between the electrolyte storage tanks 37 and 38.

The valve 41a in the conduit section 41 between the electrolyte storage tanks 36 and 37 may be magnetically operated. If the valve 41a is magnetically operated, an electromagnet 42, energized by a suitable power source 42a, may be utilized to control the operation of said valve, when the level of electrolyte in the electrolyte storage tank 37 exceeds a predetermined magnitude. The electrolyte storage tank 38 may be maintained at atmospheric pressure.

In the modification of FIG. 2, as well as in the embodiment of FIG. 1, part of the gases flowing through conduit section 54 is fed back from said conduit section to the electrolyte in the electrolyte storage tank 35 via a conduit section 58 and the pressure equalizer 59 of said electrolyte storage tank. Such feedback is similarly effective at any of the electrolyte storage tanks 5, 6, 7 and 8 of the embodiment of FIG. 1 and may be effected at the electrolyte storage tank 36 of FIG. 2.

Figure 3:
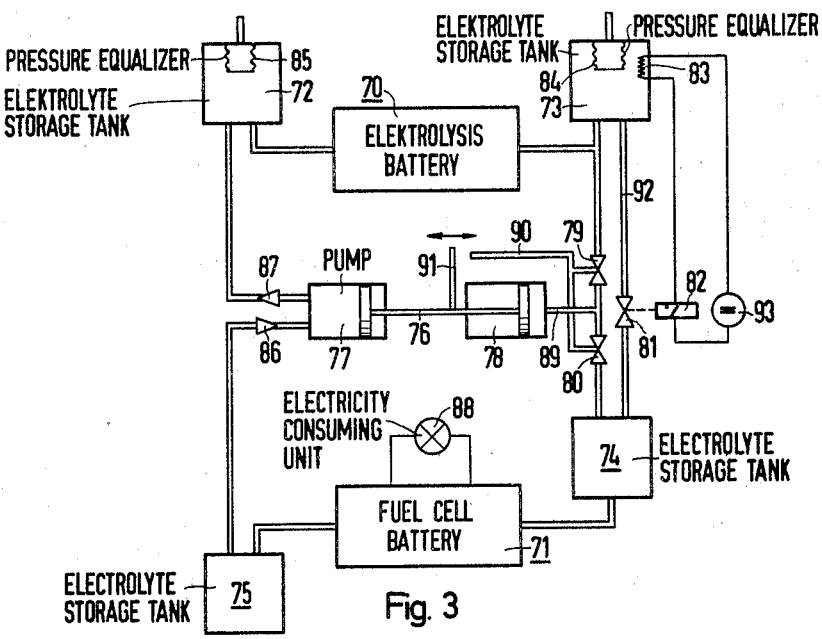
FIG. 3 is a schematic system diagram of another modification of the embodiment of FIG. 1.

In the modification of FIG. 3, the oxygen and hydrogen storage tanks are not shown in order to maintain the clarity of illustration. An electrolysis battery 70, a fuel cell battery 71 and electrolyte storage tanks 72, 73, 74 and 75 are interconnected in a closed system by a conduit in the manner disclosed in the modification of FIG. 2. The electrolyte storage tanks 72 and 73 include pressure equalizers 85 and 84, respectively. A pump 77 is interposed in the conduit section between the electrolyte storage tanks 75 and the electrolyte storage 72 in the same manner as the pump 46 is interposed in FIG. 2. A valve 86 is interposed in the conduit section between the electrolyte storage tank 75 and the pump 77, and a valve 87 is interposed in the conduit section between said pump and the electrolyte storage tank 72 in the same manner as the valves 47 and 45 of FIG. 2.

In the modification of FIG. 3, the DC generator is not shown in order to maintain the clarity of illustration, and may comprise the DC generator of either FIG. 1 or FIG. 2. The fuel cell battery 71 energizes a load or electricity-consuming unit 88 which is electrically connected thereto. In FIG. 3, the piston rod 76 of the pump 77 is mechanically coupled to the piston of the cylinder of a second pump 78. The cylinder of the pump 78 is connected by a conduit section 89 to the closed system formed by the conduit sections interconnecting the principal components of the power system. The pump 78 functions to recover compression energy in the system. Electrolyte is supplied to the cylinder of the pump 78 via a control valve 79 and to the electrolyte storage tank 74 via a control valve 80. The control valves 79 and 80 are magnetically controlled by motion of the piston rod 76 via a mechanical linkage which includes linking members 90 and 91.

A magnetically controlled valve 81 is interposed in a conduit section 92 between the electrolyte storage tank 73 and the electrolyte storage 74. The valve 81 is controlled by an electromagnet 82 which is energized by any suitable power source 93. The electromagnet 82 is energized, and therefore the valve 81 is operated, when the level of electrolyte in the electrolyte storage tank 73 reaches or exceeds a predetermined magnitude, as indicated by any suitable level indicator or sensor 83. When the valve 81 is open, electrolyte flows from the electrolyte storage tank 73 to the electrolyte storage tank 74.

The pressure equalizers 85 and 84 of the electrolyte storage tanks 72 and 73, respectively, function in the same manner as pressure equalizers of FIGS. 1 and 2, and feed back pressure from the gas storage tanks to the electrolyte of the electrolysis battery 70.

In each of FIGS. 1, 2 and 3, the electrolyte storage tanks may be chambers of the corresponding electrolysis battery or fuel cell battery.

While the invention has been described by means of specific examples and in specific embodiments, I do not wish to be limited thereto, for obvious modifications will occur to those skilled in the art without departing from the spirit and scope of the invention.

I claim:
1. An electrical power system for a load in a remote area comprising
   a DC generator;
   a pressure electrolysis battery electrically connected to and energized by said generator;
   electrolyte storage means storing gas electrolyte;
   a hydrogen-oxygen fuel cell battery;
   conduit means interconnecting said pressure electrolysis battery, said electrolyte storage means and said fuel cell battery in a closed system;
   pump means interposed in said conduit means for circulating said gas electrolyte through said closed system and between said pressure electrolysis battery and said fuel cell battery; and
   a load electrically connected to and energized by said fuel cell battery.

2. An electrical power system as claimed in claim 1, further comprising pressure equalizing means interposed in said conduit means for maintaining the same pressure in said closed system.

3. An electrical power system as claimed in claim 1, wherein said electrolyte storage means comprises a plurality of electrolyte storage tanks and wherein each of said pressure electrolysis battery and said fuel cell battery has an input coupled via said conduit means to a corresponding one of said electrolyte storage tanks and an output coupled via said conduit means to a corresponding one of said electrolyte storage tanks.

4. An electrical power system as claimed in claim 1, further comprising oxygen storage means storing oxygen and hydrogen storage means storing hydrogen, said conduit means connecting said oxygen storage means and said hydrogen storage means into said closed system.

5. An electrical power system as claimed in claim 1, further comprising means mechanically coupled to said DC generator for driving said DC generator by a natural force.

6. An electrical power system as claimed in claim 1, wherein said DC generator has a shaft, and further comprising wind sails mechanically coupled to the shaft of said DC generator for driving said DC generator by wind.

7. An electrical power system as claimed in claim 1, further comprising a piston arrangement mechanically coupled to said pump means and a cylinder housing said piston arrangement and connected by said conduit means into said closed system to recover the compression energy in said system.

8. An electrical power system as claimed in claim 6, wherein said pressure electrolysis battery includes energy means for determining the capacity of said pressure electrolysis battery, and further comprising electrical switching means interconnected between said DC generator and the energy means of said pressure electrolysis battery for adjusting the capacity of said pressure electrolysis battery in accordance with wind velocity.

9. An electrical power system as claimed in claim 6, wherein said pressure electrolysis battery includes a plurality of electrolysis cells which determine the capacity of said pressure electrolysis battery in accordance with the number of said electrolysis cells energized and further comprising electrical switching means interconnected between said DC generator and each of said electrolysis cells for selectively energizing a desired number of said electrolysis cells thereby adjusting the capacity of said pressure electrolysis battery in accordance with wind velocity.

10. An electrical power system as claimed in claim 9, wherein said DC generator comprises a plurality of DC generators mounted in said shaft and wherein said electrical switching means is interconnected between each of said DC generators and a corresponding one of said electrolysis cells, the number of said DC generators connected in circuit being determined in a manner whereby the angular velocity of said wind sails corresponds to the velocity of the wind.

References Cited

UNITED STATES PATENTS

| 2,036,613 | 4/1936 | Stuart | 290—1 |
| 2,403,564 | 7/1946 | Stein | 290—44 |
| 3,070,703 | 12/1962 | Podolny | 290—52 |
| 3,296,449 | 1/1967 | Plust et al. | 290—2 |

ORIS L. RADER, Primary Examiner

G. R. SIMMONS, Assistant Examiner

U.S. Cl. X.R.

290—1, 55